United States Patent
Zhang et al.

(10) Patent No.: US 11,512,158 B2
(45) Date of Patent: Nov. 29, 2022

(54) SELF-POLISHING ZWITTERIONIC ANTI-FOULING RESIN HAVING MAIN CHAIN DEGRADABILITY AND PREPARATION THEREFOR AND USE THEREOF

(71) Applicant: South China University of Technology, Guangzhou (CN)

(72) Inventors: Guangzhao Zhang, Guangzhou (CN); Chunfeng Ma, Guangzhou (CN); Qianni Xie, Guangzhou (CN)

(73) Assignee: South China University of Technology, Guangzhou (CN)

( * ) Notice: Subject to any disclaimer, the term of this patent is extended or adjusted under 35 U.S.C. 154(b) by 564 days.

(21) Appl. No.: 16/605,112

(22) PCT Filed: Mar. 29, 2018

(86) PCT No.: PCT/CN2018/080997
§ 371 (c)(1),
(2) Date: Oct. 14, 2019

(87) PCT Pub. No.: WO2018/188488
PCT Pub. Date: Oct. 18, 2018

(65) Prior Publication Data
US 2020/0157338 A1   May 21, 2020

(30) Foreign Application Priority Data
Apr. 14, 2017 (CN) .......................... 201710245180.3

(51) Int. Cl.
| | |
|---|---|
| *C08F 220/36* | (2006.01) |
| *C08F 212/08* | (2006.01) |
| *C08F 220/38* | (2006.01) |
| *C08F 220/14* | (2006.01) |
| *C08F 220/28* | (2006.01) |
| *C08F 226/06* | (2006.01) |
| *C08L 53/00* | (2006.01) |
| *C08F 220/18* | (2006.01) |
| *C08F 130/04* | (2006.01) |

(52) U.S. Cl.
CPC ...... *C08F 220/1802* (2020.02); *C08F 130/04* (2013.01); *C08F 212/08* (2013.01); *C08F 220/14* (2013.01); *C08F 220/281* (2020.02); *C08F 220/365* (2020.02); *C08F 220/387* (2020.02); *C08F 226/06* (2013.01); *C08L 53/00* (2013.01)

(58) Field of Classification Search
None
See application file for complete search history.

(56) References Cited

U.S. PATENT DOCUMENTS

| | | | |
|---|---|---|---|
| 9,701,794 B2 * | 7/2017 | Zhang | C09D 5/1675 |
| 2015/0353665 A1 * | 12/2015 | Minakuchi | C08F 290/124 |
| | | | 525/327.3 |
| 2019/0010268 A1 * | 1/2019 | Zhang | C08J 7/18 |

FOREIGN PATENT DOCUMENTS

| | | |
|---|---|---|
| CN | 102702422 A | 10/2012 |
| CN | 103396513 A | 11/2013 |
| CN | 103467728 A | 12/2013 |
| CN | 105542607 A | 5/2016 |
| CN | 107033278 A | 8/2017 |
| JP | 03-190974 A | 8/1991 |
| JP | 11-255869 A | 9/1999 |

OTHER PUBLICATIONS

International Search Report dated Jul. 2, 2018, Application No. PCT/CN2018/080997.

* cited by examiner

*Primary Examiner* — Tae H Yoon
(74) *Attorney, Agent, or Firm* — The Dobrusin Law Firm, PC

(57) ABSTRACT

The present invention belongs to the technical field of marine anti-fouling materials, and discloses a self-polishing zwitterionic anti-fouling resin having a main chain degradability and the preparation therefor and the use thereof. The self-polishing zwitterionic anti-fouling resin is formed by copolymerizing the following three monomers (in the total mass of the monomers): 1% to 80% of an olefinic reactive monomer, 1% to 80% of a cycloketene acetal monomer, and 1% to 80% of a betaine type precursor. The anti-fouling resin has a main chain degradability and a side chain hydrolyzability, and the transition of a coating from being hydrophobic to being hydrophilic is achieved by the hydrolysis of a surface to produce a super-hydrophilic zwitterionic surface, in order to further enhance the anti-fouling ability of the system. The material not only overcomes the disadvantages of poor mechanical properties and poor solubility in an organic solvent of a zwitterionic material, but can also effectively control the long-term stable release of an antifouling agent, so as to achieve a synergistic anti-fouling effect of the anti-fouling agent and an anti-protein. The method of the present invention is simple, has a relatively low cost, and is suitable for industrial production. The material is used in the field of marine anti-fouling coatings.

16 Claims, No Drawings

SELF-POLISHING ZWITTERIONIC ANTI-FOULING RESIN HAVING MAIN CHAIN DEGRADABILITY AND PREPARATION THEREFOR AND USE THEREOF

CLAIM OF PRIORITY

The present application is a 371 national stage entry of a prior International (PCT) Patent Application No. PCT/CN2018/080997 (filed Mar. 29, 2018), which in turn claims benefit of CN 201701245180.3 (filed Apr. 14, 2017), the contents of which are hereby expressly incorporated by reference in their entirety for all purposes.

FIELD OF THE INVENTION

The present invention belongs to the technical field of marine anti-fouling materials, and particularly relates to a self-polishing zwitterionic anti-fouling resin having a main chain degradability and the preparation therefor and the use thereof.

BACKGROUND OF THE INVENTION

There are many kinds of living things in the ocean. They may gather, grow and reproduce on the surface of ships, oil platforms, cooling water pipes and other facilities to cause marine organism fouling. This brings a series of problems to shipping, marine engineering and marine aquaculture, such as increasing ship resistance and fuel consumption, shortening the service life of marine facilities, and clogging fishing nets. At present, the main anti-fouling control technologies include release anti-fouling coatings and low surface anti-fouling coatings, in which release anti-fouling coatings dominate. The release anti-fouling coatings are mainly composed of a polymer resin, an anti-fouling agent, a solvent, a filler, and the like. The anti-fouling agent is a biotoxin, which mainly prevents and inhibits the adsorption and growth of fouling organisms. As the base of the coating and the carrier of the anti-fouling agent, the polymer resin directly affects the performance of the coating and controls the release of the anti-fouling agent, which determines its anti-fouling property, environmental performance and service life.

Depending on the resin used, anti-fouling coatings can be classified into base insoluble coatings, controlled ablative coatings, and self-polishing coatings. Among them, self-polishing anti-fouling coatings are currently dominant coatings, including anti-fouling coatings based on copper acrylate polymer, zinc acrylate polymer and silane acrylate polymer. The basic principle is that the polymer becomes hydrophilic by hydrolysis of the side chain, and then dissolves under the scouring of seawater to realize the release of the anti-fouling agent. Since only the side chain in the structure itself can be hydrolyzed, it is difficult to regulate the synergy of hydrolysis and dissolution of the polymer, such that its self-polishing property depends on the movement of the ship and the scouring of the surrounding seawater, difficult to meet the static anti-fouling requirements. Besides, the existing self-polishing polymer system itself does not have an anti-fouling function, and can only rely on the release of the anti-fouling agent to inhibit fouling organisms. However, the existing anti-fouling agent is effective on poisoning fouling organisms, but ineffective on preventing adhesion of biomacromolecules such as proteins and polysaccharides at the beginning of the fouling process.

The introduction of zwitterions in the self-polishing system will effectively enhance the inhibition of initial biofilm formation. However, since the zwitterionic polymer is a polyelectrolyte, it has defects such as strong hydrophilicity, incompatibility with coating resin, poor mechanical properties and poor construction performance. More importantly, the existing self-polishing resin is a vinyl polymer that cannot degrade under natural conditions and may cause "plastic waste pollution" in the ocean. Therefore, it is expected to prepare a long-lasting, multifunctional synergistic and environmentally friendly anti-fouling coating resin by effectively overcoming the defects of zwitterionic polymers while imparting biodegradation and multifunctional synergistic anti-fouling to traditional self-polishing resins.

CONTENTS OF THE INVENTION

In order to overcome the defects of having single anti-fouling mechanism and being unable to biodegrade of the existing self-polishing resin for marine anti-fouling coatings, the primary object of the present invention is to provide a self-polishing zwitterionic anti-fouling resin having a main chain degradability.

Another object of the present invention is to provide a preparation method for the self-polishing zwitterionic anti-fouling resin having the main chain degradability.

Still another object of the present invention is to provide use of the self-polishing zwitterionic anti-fouling resin having the main chain degradability.

The objects of the present invention are achieved by the following technical solution:

The self-polishing zwitterionic anti-fouling resin having the main chain degradability is formed by copolymerizing the following three monomers (in the total mass of the monomers):

1% to 80% of an olefinic reactive monomer;
1% to 80% of a cycloketene acetal monomer; and
1% to 80% of a betaine type precursor.

The olefinic reactive monomer is one or more of acrylate monomers, methacrylate monomers, acrylic acid, methacrylic acid, acrylamide, methacrylamide, N-methylol acrylamide, isopropyl acrylamide, styrene, vinyl pyrrolidone, and 4-vinylpyridine;

the methacrylate monomers are one or more of methyl methacrylate, ethyl methacrylate, 2-methoxyethyl methacrylate, propyl methacrylate, isopropyl methacrylate, n-butyl methacrylate, isobutyl methacrylate, tert-butyl methacrylate, octyl methacrylate, isooctyl methacrylate, dodecyl methacrylate, stearic methacrylate, polyethylene glycol methacrylate, hydroxyethyl methacrylate, glycidyl methacrylate, dimethylaminoethyl methacrylate, and diethylaminoethyl methacrylate;

the acrylate monomers are one or more of methyl acrylate, ethyl acrylate, 2-methoxyethyl acrylate, propyl acrylate, isopropyl acrylate, n-butyl acrylate, isobutyl acrylate, tert-butyl acrylate, octyl acrylate, isooctyl acrylate, dodecyl acrylate, stearic acrylate, and hydroxyethyl acrylate;

the cycloketene acetal monomer is one or more of (1) 2-methylene-1,3-dioxocyclopentane, (2) 2,4-dimethylene-1,3-dioxocyclopentane, (3) 2-methylene-4-alkyl-1,3-dioxocyclopentane, (4) 2-methylene-1,3-dioxocyclopentane, (5) 2-methylene-1,3-dioxo-4,5-benzocyclopentane, (6) 2-methylene-1,3-dioxocyclohexane, (7) 2,5-dimethylene-1,3-dioxocyclohexane, (8) 2-methylene-4-alkyl-1,3-dioxocyclohexane, (9) 2-methylene-5-phenyl-1,3-dioxocyclohexane, (10) 2-ethylidene-1,3-dioxocyclohexane, (11) 2-methylene- 1,3-dioxocycloheptane, (12) 2-methylene-5-alkyl-1,3-dioxocycloheptane, (13) 2-methylene-1,3-dioxo-5,6-benzocycloheptane, (14) 2-methylene-4,7-dimethyl-1,3-dioxocycloheptane, (15) 2-methylene-5-phenyl-1,3-dioxocycloheptane, (16) 2-methylene-1,3-dioxo-5-cycloheptene, (17) 2-ethylidene-1,3-dioxo-5,6-benzocycloheptane, (18) 2-ethylidene-4-alkyl-1,3-dioxocyclopentane, (19) 2-ethylidene-1,3-dioxocycloheptane, (20) 2-allylidene-4-phenyl-1,3-dioxocyclopentane, (21) 2-methylene-1,3,6-trioxocyclooctane, (22) 1-vinyl-4,7-dioxaspiro[2.4]heptane, (23) 1-vinyl-4,9-dioxaspiro[2.6]decane, (24) 1-vinyl-6,7-benzo-4,9-dioxaspiro[2.6]decane, and (25) 1-vinyl-5-phenyl-4,7-dioxaspiro[2.4]heptane.

The structural formula corresponding to each cycloketene acetal monomer (1 to 25) is as follows:

1
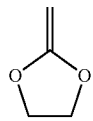

2
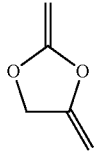

3
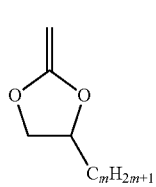

4
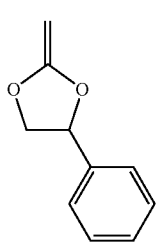

5
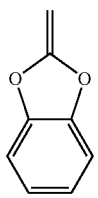

6
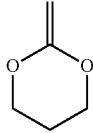

-continued

7
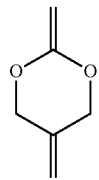

8
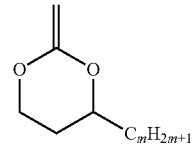

9
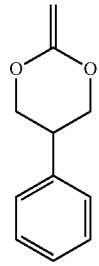

10
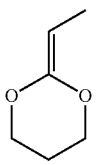

11
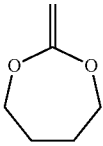

12
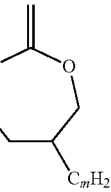

13
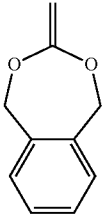

14
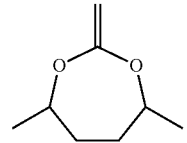

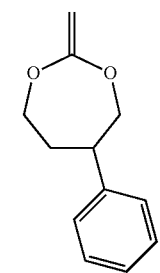

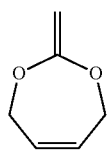

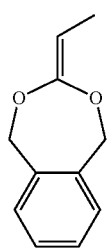

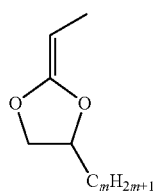

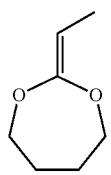

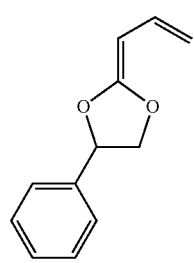

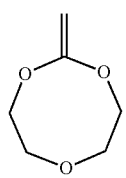

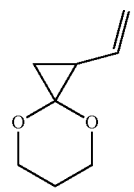

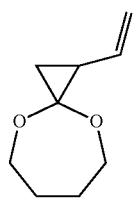

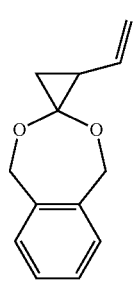

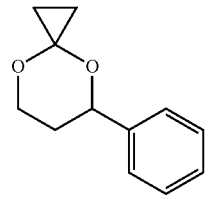

wherein m is an integer from 1 to 12.

The structural formula of the betaine type precursor is as follows:

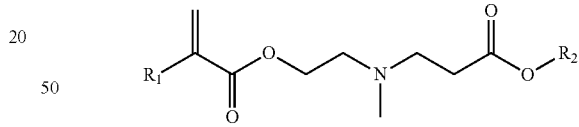

where $R_1$ represents H or $CH_3$, and $R_2$ represents an alkyl group having 2 to 10 carbon atoms (straight chain, branched chain, cyclic chain), an organic anti-fouling group, a copper-containing group, a zinc-containing group, or a silicon-containing group;

the organic anti-fouling group is one or more of N-methylene isothiazolinone (26), N-methylenebenzisothiazolinone (27), methylene paeonol (28), N-(2,4,6-trichlorophenyl)maleamide (29), N-substituted indole (30), and N-(4-hydroxy-3-methylene)benzylpropanamide (31).

The corresponding structural formula of each organic anti-fouling group (26 to 30) is as follows, where "*" represents a junction.

26

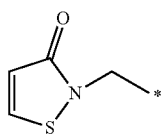

27

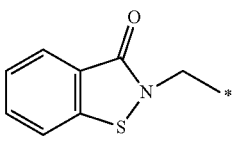

28

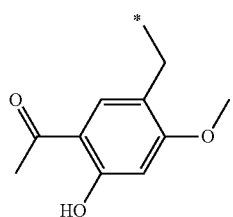

29

30

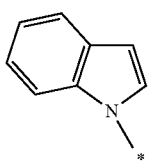

31

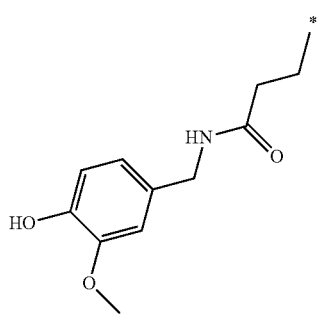

The structure of the zinc-containing group is *—Zn—O—C(O)—$R_3$, where $R_3$ is a benzene ring, or a saturated or unsaturated alkyl chain containing 1 to 10 carbon atoms, or a saturated or unsaturated cycloalkyl group, "*" represents a junction, and —O—C(O)— represents an ester group;

the structure of the zinc-containing group is *—Zn—O—C(O)—$R_4$, where $R_4$ is a benzene ring, or a saturated or unsaturated alkyl chain having 1 to 10 carbon atoms, or a saturated or unsaturated cycloalkyl group, "*" represents a junction, and —O—C(O)— represents an ester group;

the structural formula of the silicon-containing group is

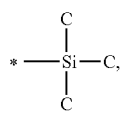

where C represents an alkyl group having 3 or 4 carbon atoms, and "*" represents a joint.

The preparation method for the self-polishing zwitterionic anti-fouling resin having the main chain degradability comprises the following steps:

(1) Preparation of the betaine type precursor: the $R_2$-containing acylate and 2-(methylamino)ethanol are subjected to an addition reaction at 0° C. to 50° C. to obtain an addition product; the addition product is acylated with (meth)acryloyl chloride at 0° C. to 30° C. to obtain a betaine type precursor, where the (meth)acryloyl chloride means methacryloyl chloride or acryloyl chloride;

(2) preparation of the anti-fouling resin: under anaerobic conditions, with an organic solvent as a medium, the olefinic reactive monomer, the cycloketene acetal monomer and the betaine type precursor are reacted at 60° C. to 150° C. for 24-48 h under the action of an initiator, and separation is performed to obtain a self-polishing zwitterionic anti-fouling resin; the self-polishing zwitterionic anti-fouling resin is used for marine anti-fouling materials.

The structural formula of the $R_2$-containing acrylate in the step (1) is

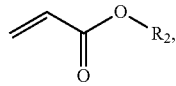

where $R_2$ is the same as the $R_2$ in the structure of the betaine type precursor.

In the step (1), the addition reaction time is 6-12 h, and the acylation reaction time is 6-12 h.

The molar ratio of the $R_2$-containing acrylate to 2-(methylamino)ethanol to (meth)acryloyl chloride in the step (1) is 1:(1 to 1.5):(1 to 2).

The organic solvent in the step (2) is one or more of tetrahydrofuran, 1,4-dioxane, N,N-dimethylformamide, acetonitrile, n-butanol, toluene, and xylene.

The initiator in the step (2) is azobisisobutyronitrile, azobisisoheptanenitrile, dibenzoyl peroxide or t-butyl hydroperoxide.

In the step (2), the initiator is used in an amount of 0.1% to 5% in the total mass of the olefinic reactive monomer, the cycloketene acetal monomer and the betaine type precursor.

Compared with the prior art, the present invention has the following advantages and beneficial effects:

(1) The resin of the present invention is prepared by radical ring-opening polymerization of the olefinic reactive monomer, the cycloketene acetal monomer, and the hydrophobic betaine type precursor capable of releasing an anti-fouling agent by hydrolysis; in addition to the main chain degradability (imparted by the cycloketene acetal monomer) and side chain hydrolyzability (imparted by the hydrophobic betaine type precursor capable of releasing an anti-fouling agent by hydrolysis), the material can also realize the conversion of zwitterion by the release of the anti-fouling agent; that is, the transition of a coating from being hydrophobic to being hydrophilic is achieved by the hydrolysis of a surface to produce a super-hydrophilic zwitterionic surface, in order to further enhance the anti-fouling ability of the system.

(2) The resin not only overcomes the disadvantages of a zwitterionic material, i.e., poor mechanical properties and poor solubility in an organic solvent, but can also effectively control the long-term stable release of an anti-fouling agent by combining the advantages of traditional self-polishing resins, so as to achieve a synergistic anti-fouling effect of the anti-fouling agent and an anti-protein.

(3) The resin, biodegradable in the marine environment, is an environmentally friendly material.

(4) The method is simple, has a relatively low cost, and is suitable for industrial production; this material has a good application prospect in the field of preparation of marine anti-fouling coatings.

DETAILED DESCRIPTION OF THE EMBODIMENTS

The present invention will be further described in detail below with reference to specific examples, but the embodiments of the present invention are not limited thereto.

Example 1

A preparation method for the self-polishing zwitterionic anti-fouling resin having the main chain degradability comprises the following steps:

(1) Preparation of the Betaine Type Precursor:
ethyl acrylate and 2-(methylamino)ethanol were reacted at a molar ratio of 1:1 at 30° C. for 6 h to obtain an addition product; the addition product was reacted with acryloyl chloride at 0° C. for 12 h to obtain a betaine type precursor with an ethyl group as the $R_2$ group; wherein the ratio of ethyl acrylate to acryloyl chloride was 1:1.2;

(2) 20 ml of tetrahydrofuran was added to a polymerization tube, and then 5 g of methyl methacrylate, 5 g of the betaine type precursor with an ethyl group as the $R_2$ group, 5 g of 2-methylene-1,3-dioxocycloheptane and 0.1 g of azobisisobutyronitrile were added; after oxygen was removed by passing nitrogen for 30 min, the polymerization tube was put into an oil bath at 60° C. and reacted for 24 h; after the polymerization tube was taken out, the solvent was concentrated, precipitation was performed with n-hexane, and the precipitate was dried in vacuum at 50° C. for 24 h to obtain a product of self-polishing zwitterionic anti-fouling resin; the resulting self-polishing zwitterionic anti-fouling resin has the following structure:

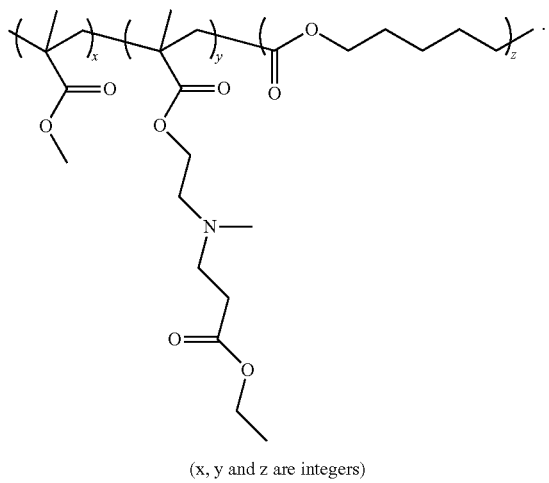

(x, y and z are integers)

The anti-fouling resin of this example showed no adhesion of marine fouling organisms in a 6-month real sea hanging board test.

Example 2

A preparation method for the self-polishing zwitterionic anti-fouling resin having the main chain degradability comprises the following steps:

(1) Preparation of the Betaine Type Precursor:
N-methylenebenzisothiazolinone acrylate and 2-(methylamino)ethanol were reacted at a molar ratio of 1:1.5 at 0° C. for 12 h to obtain an addition product; the addition product was reacted with acryloyl chloride at 10° C. for 12 h to obtain a betaine type precursor with N-methylenebenzisothiazolinone as the $R_2$ group; wherein the molar ratio of N-methylenebenzisothiazolinone acrylate to acryloyl chloride was 1:2;

(2) 20 ml of 1,4-dioxane was added to a polymerization tube, and then 5 g of ethyl acrylate, 2.5 g of the betaine type precursor with N-methylenebenzisothiazolinone as the $R_2$ group, 2.5 g of 2-methylene-4-methyl-1,3-dioxocyclopentane and 0.1 g of azobisisoheptanenitrile were added; after oxygen was removed by passing nitrogen for 30 min, the polymerization tube was put into an oil bath at 80° C. and reacted for 48 h; after the polymerization tube was taken out, the solvent was concentrated, precipitation was performed with n-hexane, and the precipitate was dried in vacuum at 50° C. for 24 h to obtain a product of self-polishing zwitterionic anti-fouling resin; the resulting self-polishing zwitterionic anti-fouling resin has the following structure:

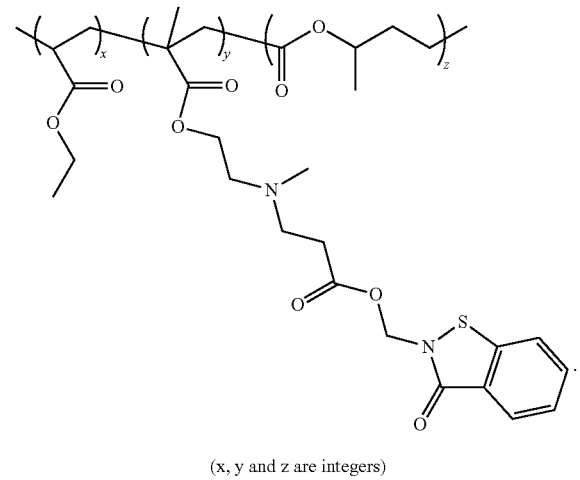

(x, y and z are integers)

The anti-fouling resin of this example could effectively delay the formation of microbial biofilm, and showed effective prevention of adhesion of marine fouling organisms in an 8-month real sea hanging board test.

Example 3

A preparation method for the self-polishing zwitterionic anti-fouling resin having the main chain degradability comprises the following steps:

(1) Preparation of the Betaine Type Precursor:
methylene paeonol acrylate and 2-(methylamino)ethanol were reacted at a molar ratio of 1:1.2 at 30° C. for 6 h to obtain an addition product; the addition product was reacted with acryloyl chloride at 10° C. for 12 h to obtain a betaine type precursor with methylene paeonol as the R₂ group; wherein the molar ratio of methylene paeonol acrylate to acryloyl chloride was 1:1.1;

(2) 20 ml of N,N-dimethylformamide was added to a polymerization tube, and then 1 g of acrylic acid, 2 g of the betaine type precursor with methylene paeonol as the R₂ group, 1 g of 2-methylene-1,3-dioxo-5,6-benzocycloheptane and 0.2 g of azobisisobutyronitrile were added; after oxygen was removed by freeze pumping for three times, the polymerization tube was put into an oil bath at 70° C. and reacted for 36 h; after the polymerization tube was taken out, the solvent was concentrated, precipitation was performed with petroleum ether, and the precipitate was dried in vacuum at 50° C. for 24 h to obtain a product of self-polishing zwitterionic anti-fouling resin; the resulting self-polishing zwitterionic anti-fouling resin has the following structure:

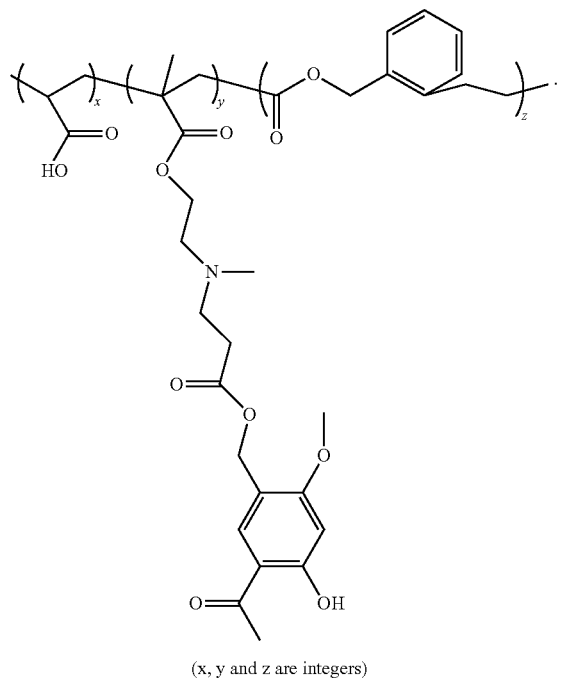

(x, y and z are integers)

The anti-fouling resin of this example had complete resistance to protein adsorption and greatly reduced the adhesion of marine bacteria, showing effective prevention of adhesion of marine fouling organisms in a 12-month real sea hanging board test.

Example 4

A preparation method for the self-polishing zwitterionic anti-fouling resin having the main chain degradability comprises the following steps:

(1) Preparation of the Betaine Type Precursor:

3-((4-hydroxy-3-methoxybenzyl)amino)-3-oxopropyl acrylate and 2-(methylamino)ethanol were reacted at a molar ratio of 1:1.3 at 50° C. for 10 h to obtain an addition product; the addition product was reacted with acryloyl chloride at 15° C. for 12 h to obtain a betaine type precursor with N-(4-hydroxy-3-methylene)benzylpropanamide as the R₂ group; wherein the molar ratio of 3-((4-hydroxy-3-methoxybenzyl)amino)-3-oxopropyl acrylate to acryloyl chloride was 1:1.8;

(2) 10 ml of xylene was added to a polymerization tube, and then 1 g of styrene, 1 g of the betaine type precursor with N-(4-hydroxy-3-methylene)benzylpropanamide as the R₂ group, 1 g of 2-methylene-1,3-dioxocyclohexane and 0.02 g of t-butyl hydroperoxide were added; after oxygen was removed by freeze pumping for three times, the polymerization tube was put into an oil bath at 150° C. and reacted for 24 h; after the polymerization tube was taken out, the solvent was concentrated, precipitation was performed with ether, and the precipitate was dried in vacuum at 50° C. for 24 h to obtain a product of self-polishing zwitterionic anti-fouling resin; the resulting self-polishing zwitterionic anti-fouling resin has the following structure:

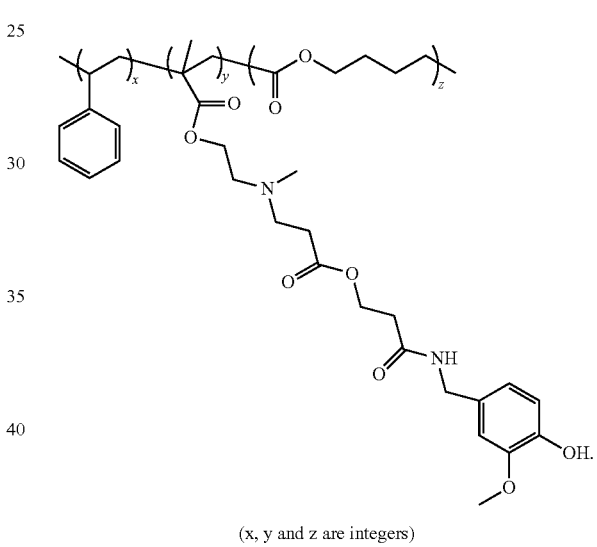

(x, y and z are integers)

The anti-fouling resin of this example showed effective prevention of adhesion of marine fouling organisms in a 12-month real sea hanging board test.

Example 5

A preparation method for the self-polishing zwitterionic anti-fouling resin having the main chain degradability comprises the following steps:

(1) Preparation of the Betaine Type Precursor:

zinc acetate acrylate and 2-(methylamino)ethanol were reacted at a molar ratio of 1:1.2 at 40° C. for 10 h to obtain an addition product; the addition product was reacted with acryloyl chloride at 5° C. for 10 h to obtain a betaine type precursor with zinc acetate as the R₂ group; wherein the molar ratio of zinc acetate acrylate to acryloyl chloride was 1:1.5;

(2) 20 ml of n-butyl alcohol was added to a polymerization tube, and then 1 g of hydroxyethyl acrylate, 1 g of the betaine type precursor with zinc acetate as the R₂ group, 1 g of 2-methylene-1,3-dioxo-5-cycloheptene and 0.02 g of dibenzoyl peroxide were added; after oxygen was removed by passing nitrogen for 30 min, the polymerization tube was put into an oil bath at 80° C. and reacted for 48 h; after the polymerization tube was taken out, the solvent was concentrated, precipitation was performed with n-hexane, and the precipitate was dried in vacuum at 50° C. for 24 h to obtain a product of self-polishing zwitterionic anti-fouling resin; the resulting self-polishing zwitterionic anti-fouling resin has the following structure:

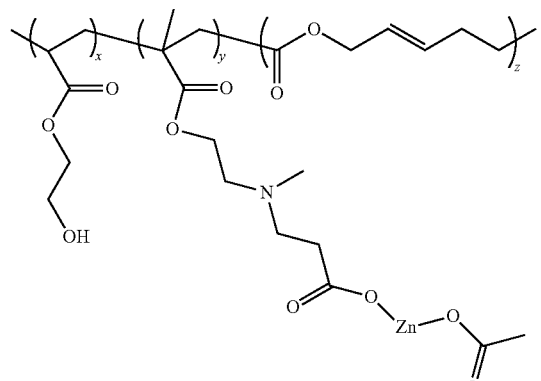

(x, y and z are integers)

The anti-fouling resin of this example showed effective prevention of adhesion of marine fouling organisms in a 14-month real sea hanging board test.

Example 6

A preparation method for the self-polishing zwitterionic anti-fouling resin having the main chain degradability comprises the following steps:

(1) Preparation of the Betaine Type Precursor:

triisopropylsilyl acrylate and 2-(methylamino)ethanol were reacted at a molar ratio of 1:1 at 50° C. for 10 h to obtain an addition product; the addition product was reacted with acryloyl chloride at 5° C. for 12 h to obtain a betaine type precursor with triisopropylsilane as the $R_2$ group; wherein the molar ratio of triisopropylsilyl acrylate to acryloyl chloride was 1:1.5;

(2) 5 ml of acetonitrile was added to a polymerization tube, and then 1.6 g of methyl acrylate, 0.4 g of the betaine type precursor with triisopropylsilane as the $R_2$ group, 1 g of 2-methylene-5-phenyl-1,3-dioxocycloheptane and 0.02 g of azobisisobutyronitrile were added; after oxygen was removed by passing nitrogen for 30 min, the polymerization tube was put into an oil bath at 70° C. and reacted for 24 h; after the polymerization tube was taken out, the solvent was concentrated, precipitation was performed with n-hexane, and the precipitate was dried in vacuum at 50° C. for 24 h to obtain a product of self-polishing zwitterionic anti-fouling resin; the resulting self-polishing zwitterionic anti-fouling resin has the following structure:

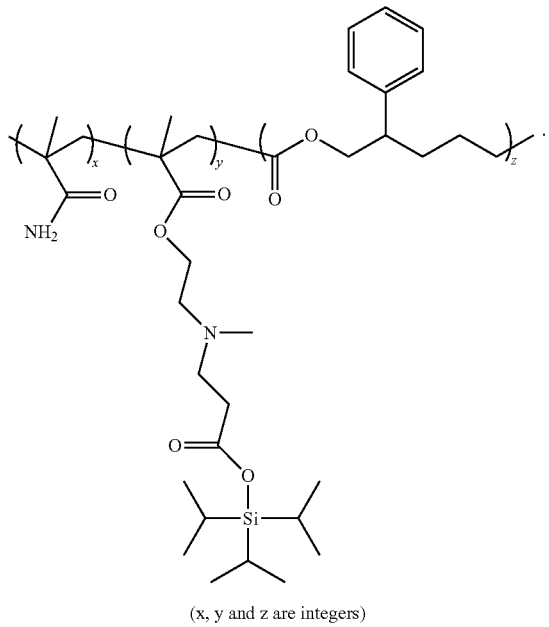

(x, y and z are integers)

The anti-fouling resin of this example showed effective prevention of adhesion of marine fouling organisms in a 14-month real sea hanging board test.

Example 7

A preparation method for the self-polishing zwitterionic anti-fouling resin having the main chain degradability comprises the following steps:

(1) Preparation of the Betaine Type Precursor:

copper benzoate acrylate and 2-(methylamino)ethanol were reacted at a molar ratio of 1:1 at 0° C. for 10 h to obtain an addition product; the addition product was reacted with acryloyl chloride at 5° C. for 10 h to obtain a betaine type precursor with copper benzoate as the $R_2$ group; wherein the molar ratio of copper benzoate acrylate to acryloyl chloride was 1:1.5;

(2) 20 ml of xylene was added to a polymerization tube, and then 1 g of 4-vinylpyridine, 0.5 g of the betaine type precursor with copper benzoate as the $R_2$ group, 2 g of 2-methylene-1,3,6-trioxocyclooctane and 0.02 g of dibenzoyl peroxide were added; after oxygen was removed by passing nitrogen for 30 min, the polymerization tube was put into an oil bath at 80° C. and reacted for 24 h; after the polymerization tube was taken out, the solvent was concentrated, precipitation was performed with n-hexane, and the precipitate was dried in vacuum at 50° C. for 24 h to obtain a product of self-polishing zwitterionic anti-fouling resin; the resulting self-polishing zwitterionic anti-fouling resin has the following structure:

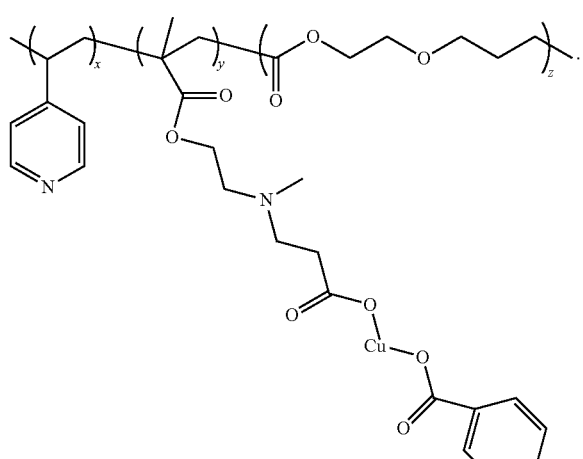

(x, y and z are integers)

The anti-fouling resin of this example showed effective prevention of adhesion of marine fouling organisms in a 10-month real sea hanging board test.

The invention claimed is:

1. A self-polishing zwitterionic anti-fouling resin having a main chain degradability, characterized in that: the resin is formed by copolymerizing the following three monomers (in the total mass of monomers):

| | |
|---|---|
| an olefinic reactive monomer | 1% to 80% |
| a cycloketene acetal monomer | 1% to 80% |
| a betaine type precursor | 1% to 80% | the cycloketene acetal monomer has one or more of the structural formulas 1 to 25:

1
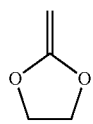

2
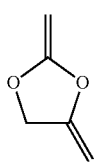

3
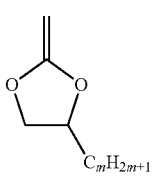

4
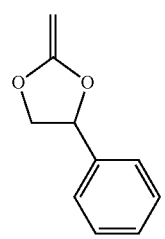

5
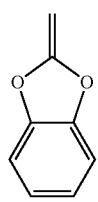

6
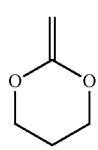

7
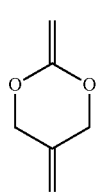

8
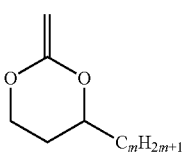

9
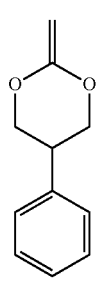

10
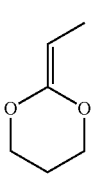

11
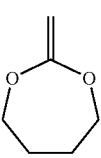

12
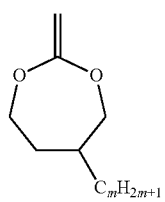
13
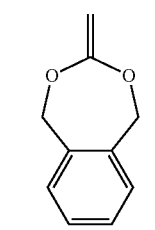
14
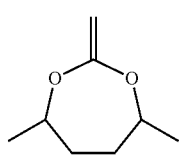
15
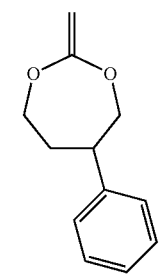
16
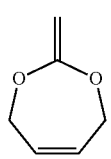
17
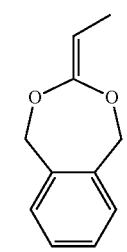
18
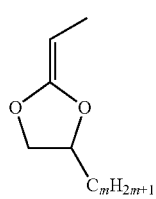
19
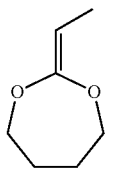
20
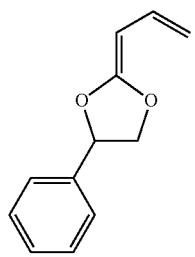
21
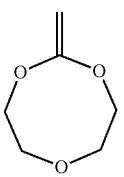
22
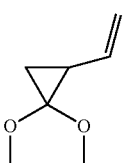
23
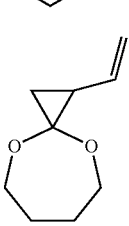
24
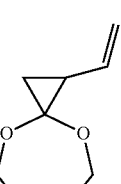
25
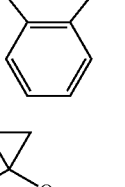
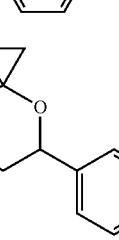
where m is an integer from 1 to 12;
the olefinic reactive monomer is one or more of acrylate monomers, methacrylate monomers, acrylic acid, methacrylic acid, acrylamide, methacrylamide, N-methylol acrylamide, isopropyl acrylamide, styrene, vinyl pyrrolidone, and 4-vinylpyridine;

the structural formula of the betaine type precursor is as follows:

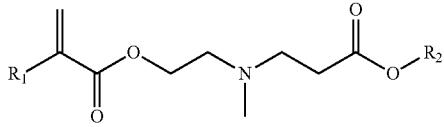

where $R_1$ represents H or $CH_3$, and $R_2$ represents an alkyl group having 2 to 10 carbon atoms, an organic anti-fouling group, a copper-containing group, a zinc-containing group, or a silicon-containing group.

2. The self-polishing zwitterionic anti-fouling resin having the main chain degradability according to claim 1, characterized in that: the methacrylate monomers are one or more of methyl methacrylate, ethyl methacrylate, 2-methoxyethyl methacrylate, propyl methacrylate, isopropyl methacrylate, n-butyl methacrylate, isobutyl methacrylate, tert-butyl methacrylate, octyl methacrylate, isooctyl methacrylate, dodecyl methacrylate, stearic methacrylate, polyethylene glycol methacrylate, hydroxyethyl methacrylate, glycidyl methacrylate, dimethylaminoethyl methacrylate, and diethylaminoethyl methacrylate; and the acrylate monomers are one or more of methyl acrylate, ethyl acrylate, 2-methoxyethyl acrylate, propyl acrylate, isopropyl acrylate, n-butyl acrylate, isobutyl acrylate, tert-butyl acrylate, octyl acrylate, isooctyl acrylate, dodecyl acrylate, stearic acrylate, and hydroxyethyl acrylate.

3. The self-polishing zwitterionic anti-fouling resin having the main chain degradability according to claim 1, characterized in that: the organic anti-fouling a group has one of structural formulas 26 to 31, where "*" represents a junction:

26
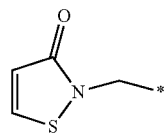

27
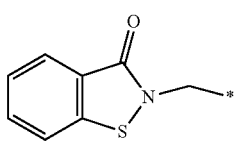

28
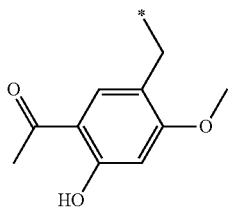

29
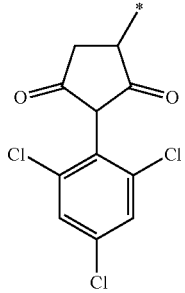

30
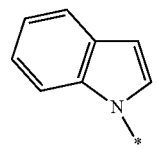

31
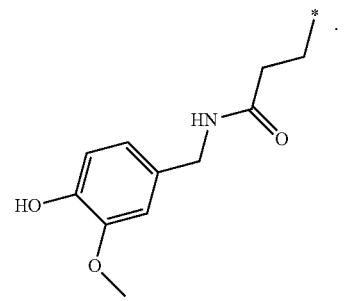

4. The self-polishing zwitterionic anti-fouling resin having the main chain degradability according to claim 1, characterized in that: the structure of the zinc-containing group is *—Zn—O—C(O)—$R_3$, where $R_3$ is a benzene ring, or a saturated or unsaturated alkyl chain containing 1 to 10 carbon atoms, or a saturated or unsaturated cycloalkyl group, "*" represents a junction, and —O—C(O)— represents an ester group;

the structure of the copper-containing group is *—Cu—O—C(O)—$R_4$, where $R_4$ is a benzene ring, or a saturated or unsaturated alkyl chain containing 1 to 10 carbon atoms, or a saturated or unsaturated cycloalkyl group, "*" represents a junction, and —O—C(O)— represents an ester group; and the structural formula of the silicon-containing group is

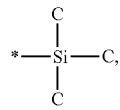

where C represents an alkyl group having 3 or 4 carbon atoms, and "*" represents a joint.

5. A preparation method for the self-polishing zwitterionic anti-fouling resin having the main chain degradability according to claim 1, characterized in that: the method comprises the following steps:

(1) preparation of the betaine type precursor: the $R_2$-containing acrylate and 2-(methylamino)ethanol are subjected to an addition reaction at 0° C. to 50° C. to obtain an addition product; the addition product is acylated with (meth)acryloyl chloride at 0° C. to 30° C. to obtain a betaine type precursor;

wherein the (meth)acryloyl chloride means methacryloyl chloride or acryloyl chloride; the structural formula of the R$_2$-containing acrylate is

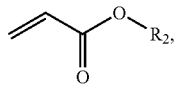

where R$_2$ is the same as R$_2$ in the structural formula of the betaine type precursor of claim 1;

(2) preparation of the anti-fouling resin: under anaerobic conditions, with an organic solvent as a medium, the olefinic reactive monomer, the cycloketene acetal monomer and the betaine type precursor are reacted at 60° C. to 150° C. for 24-48 h under the action of an initiator, and separation is performed to obtain a self-polishing zwitterionic anti-fouling resin.

6. The preparation method for the self-polishing zwitterionic anti-fouling resin having the main chain degradability according to claim 5, characterized in that: the molar ratio of the R$_2$-containing acrylate to 2-(methylamino)ethanol to (meth)acryloyl chloride in the step (1) is 1:(1 to 1.5):(1 to 2).

7. The preparation method for the self-polishing zwitterionic anti-fouling resin having the main chain degradability according to claim 5, characterized in that: in the step (1), the addition reaction time is 6-12 h, and the acylation reaction time is 6-12 h.

8. The preparation method for the self-polishing zwitterionic anti-fouling resin having the main chain degradability according to claim 5, characterized in that: the organic solvent in the step (2) is one or more of tetrahydrofuran, 1,4-dioxane, N,N-dimethylformamide, acetonitrile, n-butanol, toluene, and xylene; and
the initiator in the step (2) is azobisisobutyronitrile, azobisisoheptanenitrile, dibenzoyl peroxide or t-butyl hydroperoxide.

9. The preparation method for the self-polishing zwitterionic anti-fouling resin having the main chain degradability according to claim 5, characterized in that: in the step (2), the initiator is used in an amount of 0.1% to 5% in the total mass of the olefinic reactive monomer, the cycloketene acetal monomer and the betaine type precursor.

10. A method for preventing fouling of a marine structure comprising applying the self-polishing zwitterionic anti-fouling resin having the main chain degradability according to claim 1 to at least one surface of the structure.

11. A preparation method for the self-polishing zwitterionic anti-fouling resin having the main chain degradability according to claim 2, characterized in that: the method comprises the following steps:

(1) preparation of the betaine type precursor: the R$_2$-containing acrylate and 2-(methylamino)ethanol are subjected to an addition reaction at 0° C. to 50° C. to obtain an addition product; the addition product is acylated with (meth)acryloyl chloride at 0° C. to 30° C. to obtain a betaine type precursor;
wherein the (meth)acryloyl chloride means methacryloyl chloride or acryloyl chloride; the structural formula of the R$_2$-containing acrylate is

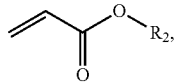

where R$_2$ is the same as R$_2$ in the structural formula of the betaine type precursor of claim 1;

(2) preparation of the anti-fouling resin: under anaerobic conditions, with an organic solvent as a medium, the olefinic reactive monomer, the cycloketene acetal monomer and the betaine type precursor are reacted at 60° C. to 150° C. for 24-48 h under the action of an initiator, and separation is performed to obtain a self-polishing zwitterionic anti-fouling resin.

12. A preparation method for the self-polishing zwitterionic anti-fouling resin having the main chain degradability according to claim 3, characterized in that: the method comprises the following steps:

(1) preparation of the betaine type precursor: the R$_2$-containing acrylate and 2-(methylamino)ethanol are subjected to an addition reaction at 0° C. to 50° C. to obtain an addition product; the addition product is acylated with (meth)acryloyl chloride at 0° C. to 30° C. to obtain a betaine type precursor;
wherein the (meth)acryloyl chloride means methacryloyl chloride or acryloy chloride; the structural formula of the R$_2$-containing acrylate is

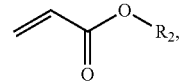

where R$_2$ is the same as R$_2$ in the structural formula of the betaine type precursor of claim 1;

(2) preparation of the anti-fouling resin: under anaerobic conditions, with an organic solvent as a medium, the olefinic reactive monomer, the cycloketene acetal monomer and the betaine type precursor are reacted at 60° C. to 150° C. for 24-48 h under the action of an initiator, and separation is performed to obtain a self-polishing zwitterionic anti-fouling resin.

13. A preparation method for the self-polishing zwitterionic anti-fouling resin having the main chain degradability according to claim 4, characterized in that: the method comprises the following steps:

(1) preparation of the betaine type precursor: the R$_2$-containing acrylate and 2-(methylamino)ethanol are subjected to an addition reaction at 0° C. to 50° C. to obtain an addition product; the addition product is acylated with (meth)acryloyl chloride at 0° C. to 30° C. to obtain a betaine type precursor;
wherein the (meth)acryloyl chloride means methacryloyl chloride or acryloyl chloride; the structural formula of the R$_2$-containing acrylate is

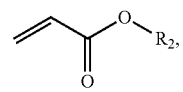

where R$_2$ is the same as R$_2$ in the structural formula of the betaine type precursor of claim 1;

(2) preparation of the anti-fouling resin: under anaerobic conditions, with an organic solvent as a medium, the olefinic reactive monomer, the cycloketene acetal monomer and the betaine type precursor are reacted at 60° C. to 150° C. for 24-48 h under the action of an initiator, and separation is performed to obtain a self-polishing zwitterionic anti-fouling resin.

14. A method for preventing fouling of a marine structure comprising applying the self-polishing zwitterionic antifouling resin having the main chain degradability according to claim 2 to at least one surface of the structure.

15. A method for preventing fouling of a marine structure comprising applying the self-polishing zwitterionic antifouling resin having the main chain degradability according to claim 3 to at least one surface of the structure.

16. A method for preventing fouling of a marine structure comprising applying the self-polishing zwitterionic antifouling resin having the main chain degradability according to claim 4 to at least one surface of the structure.

* * * * *